(12) United States Patent
Hartmann et al.

(10) Patent No.: US 9,950,344 B2
(45) Date of Patent: Apr. 24, 2018

(54) ACTUATION OF A CONVEYING SYSTEM

(71) Applicants: Bernd Hartmann, Grafschaft-Leimersdorf (DE); Ingo Tzschichholtz, Frankfurt (DE)

(72) Inventors: Bernd Hartmann, Grafschaft-Leimersdorf (DE); Ingo Tzschichholtz, Frankfurt (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 15/286,989

(22) Filed: Oct. 6, 2016

(65) Prior Publication Data
US 2017/0100749 A1 Apr. 13, 2017

(30) Foreign Application Priority Data
Oct. 9, 2015 (DE) ........................ 10 2015 117 241

(51) Int. Cl.
G06K 7/10 (2006.01)
B07C 3/00 (2006.01)
B07C 1/04 (2006.01)
B65G 47/26 (2006.01)

(52) U.S. Cl.
CPC ............... B07C 3/006 (2013.01); B07C 1/04 (2013.01); B65G 47/26 (2013.01); B65G 47/265 (2013.01); G06K 7/10792 (2013.01); G06K 7/10861 (2013.01)

(58) Field of Classification Search
CPC ........... B07C 3/006; B07C 1/04; B65G 47/26; G06K 7/10792
See application file for complete search history.

(56) References Cited

U.S. PATENT DOCUMENTS

| 5,396,977 A | 3/1995 | Lantis et al. |
| 5,900,611 A * | 5/1999 | Hecht ................ G06K 7/10861 235/454 |
| 5,921,374 A | 7/1999 | Takino et al. |
| 6,179,113 B1 | 1/2001 | Wünscher et al. |

(Continued)

FOREIGN PATENT DOCUMENTS

| DE | 38 23 728 C2 | 1/1990 |
| DE | 603 20 572 T2 | 6/2009 |

(Continued)

*Primary Examiner* — Thomas Randazzo
(74) *Attorney, Agent, or Firm* — Reinhart Boerner Van Deuren P.C.

(57) ABSTRACT

An apparatus receives data from at least one detection device which regularly detects single items on a sorting surface of a conveying system. Here, a separately actuatable drive element is assigned in each case to a plurality of partial surfaces of the sorting surface. The device regularly determines a region on the sorting surface taken up by the respective single item on the basis of the obtained data by means of triangulations for as long as the single item is situated on the sorting surface. The device determines control commands for actuating the drive elements, which are assigned to a partial surface and correspond to a specific region on the sorting surface taken up by the respective single item, on the basis of a destination at the sorting surface provided for the respective single item. Then, the device actuates the drive elements with the determined control commands.

20 Claims, 2 Drawing Sheets

(56) References Cited

U.S. PATENT DOCUMENTS

| | | | |
|---|---|---|---|
| 6,189,677 B1 | 2/2001 | Ruf et al. | |
| 6,694,220 B1* | 2/2004 | Tanz | B65G 1/0478 |
| | | | 198/369.4 |
| 8,360,316 B2* | 1/2013 | Reichenbach | G06K 7/10792 |
| | | | 235/436 |
| 8,993,914 B2* | 3/2015 | Kujacznski | B07C 5/342 |
| | | | 209/576 |
| 9,228,957 B2* | 1/2016 | Kujacznski | G01N 21/89 |
| 2002/0039706 A1* | 4/2002 | Kamimura | B41J 2/475 |
| | | | 430/346 |
| 2002/0046923 A1* | 4/2002 | Herubel | B65G 47/31 |
| | | | 198/444 |
| 2003/0234155 A1 | 2/2003 | Kanamori et al. | |
| 2003/0141165 A1* | 7/2003 | Reznik | B65G 1/0478 |
| | | | 198/434 |
| 2004/0104100 A1* | 6/2004 | Schiesser | B65G 15/22 |
| | | | 198/460.1 |
| 2006/0283689 A1* | 12/2006 | Schiesser | B65G 15/22 |
| | | | 198/395 |
| 2013/0110280 A1* | 5/2013 | Folk | B65G 1/137 |
| | | | 700/215 |
| 2013/0126399 A1* | 5/2013 | Wolff | B07C 5/3425 |
| | | | 209/555 |
| 2015/0107960 A1* | 4/2015 | Guo | B65G 39/025 |
| | | | 198/464.1 |
| 2015/0107961 A1* | 4/2015 | Guo | B65G 39/025 |
| | | | 198/464.1 |

FOREIGN PATENT DOCUMENTS

| | | |
|---|---|---|
| EP | 1 184 310 A1 | 3/2002 |
| WO | WO 00/76887 A1 | 12/2000 |
| WO | WO 2004/039706 A1 | 5/2004 |
| WO | WO 2011/131573 A1 | 10/2011 |

* cited by examiner

ACTUATION OF A CONVEYING SYSTEM

CROSS-REFERENCE TO RELATED PATENT APPLICATION

This patent application claims priority to German Application No. 10 2015 117 241.0, filed Oct. 9, 2015, the entire teachings and disclosure of which are incorporated herein by reference thereto.

FIELD OF THE INVENTION

The present invention relates to the actuation of a conveying system with a sorting function and, in particular, to a method, an apparatus and a computer program for such an actuation, and a system in which such an actuation is implemented.

BACKGROUND OF THE INVENTION

Conveying systems with a sorting function are known in practice for a multiplicity of fields of use. By way of example, a sorting function can be provided in order to provide single items at one of a plurality of issuing points. There, they can be supplied to a conveyor belt or brought into a roll container. Here, single items can be e.g. packages, such as parcels or letters, but also other items such as unpackaged wares or intermediate products.

In logistics, packages can be transported as bulk cargo in vehicles and stored as bulk cargo in system parts of a conveying system. Modern methods of unloading technology also enable efficient unloading of interchange containers with packages in such a way that packages can be supplied to the conveying technology as bulk cargo. Here, bulk cargo in logistics can be subdivided into three classes: 3D bulk, 2D bulk and 1D bulk. In 3D bulk, packages lie over one another, under one another, next to one another, in front of one another and behind one another in an unordered sequence. In 2D bulk, packages lie next to one another, in front of one another and behind one another in an unordered sequence, but not over one another or under one another. In 1D bulk, packages lie behind one another in an unordered sequence, but not next to one another, under one another or over one another. Packages lie behind one another precisely if no package covers another from a lateral observation point (at right angles to the conveying direction). Here, the distance between the packages plays no role. Moreover, packages are considered to be singulated if they are arranged in 1D bulk with an interstice greater than zero. In many conveying systems, transportation is initially carried out as a 3D bulk or, predominantly, as 2D bulk. However, then the transport of packages is carried out as single item flow, i.e. as 1D bulk, in most regions of conveying systems because it is only in this manner that the individual package can be supplied to its final point in the system.

GENERAL DESCRIPTION OF SOME EXEMPLARY EMBODIMENTS OF THE INVENTION

One of the objects of the invention consists of a particularly efficient use of a sorting surface of a conveying system.

An exemplary embodiment of a method according to the invention comprises the step of receiving data from at least one detection device which regularly detects single items on a sorting surface of a conveying system, wherein a separately actuatable drive element is assigned in each case to a plurality of partial surfaces of the sorting surface. The method furthermore comprises the step of regularly determining a region on the sorting surface taken up by the respective single item on the basis of the obtained data by means of triangulations for as long as the single item is situated on the sorting surface. The method furthermore comprises the step of determining control commands for actuating the drive elements, which are assigned to a partial surface and correspond to a specific region on the sorting surface taken up by the respective single item, on the basis of a destination at the sorting surface provided for the respective single item. The method furthermore comprises the step of actuating the drive elements with the determined control commands.

An exemplary embodiment of an apparatus according to the invention comprises means for prompting the apparatus or a system to perform any embodiment of the method according to the invention. By way of example, the means can comprise at least one memory with program instructions and at least one processor. The at least one processor can be configured to perform program instructions from the at least one memory. The program instructions can be configured to prompt the apparatus or the system to carry out any embodiment of the method according to the invention when they are performed by the at least one processor. The memory can be a volatile or nonvolatile memory. The memory can be replaceable or fixedly integrated into the apparatus. The apparatus can comprise any further components. It is understood that, alternatively, the means can also be realized using switching technology, at least in part. By way of example, the apparatus according to the invention can be a control device. By way of example, such a control device can be a computer—e.g. an industrial PC—or a server. The apparatus according to the invention can likewise be a module for any control device.

An exemplary embodiment of the system according to the invention comprises any embodiment of an apparatus according to the invention and, moreover, the conveying system with the sorting surface and/or the at least one detection device arranged for detecting single items on the sorting surface. The system can comprise any further elements.

An exemplary embodiment of a computer program according to the invention comprises program instructions which are configured to prompt an apparatus or a system to carry out any method according to the invention when they are performed by at least one processor.

The computer program can be stored in an article-type computer-readable medium, for example in a volatile or non-volatile program memory of an apparatus or on a memory chip or memory stick. However, it can also be transferred by way of the Internet and/or by way of wired lines.

In order to obtain high efficiency in the material flow in a conveying system, many single items must be transported per unit area. However, there is a great decrease in efficiency as a result of the conventional singulating of the single items for processing in terms of conveying, which contains an individual treatment of the single items from a material flow point of view.

Therefore, for specific exemplary embodiments, the invention provides, for the transport of single items on a sorting surface, for the positions of all single items on the sorting surface to be detected continuously by at least one detection device. The data from the at least one detection device enable a location measurement by means of triangulation of a region occupied by a single item. Moreover, for specific exemplary embodiments, the invention provides for the sorting surface to have a plurality of partial surfaces, in which a separately actuatable drive element can in each case contribute to the conveying of a single item lying thereon. Then, on the basis of the continuously determined position of a single item, there can in each case be an actuation of precisely those drive elements which are able to contribute to the movement of the single item in the direction of the destination thereof at the current time.

By detecting geometry information for a single item, it is possible to actuate drive elements in a very targeted manner in those regions where they are currently required for conveying a single item. As a result, it is possible firstly to manipulate each single item individually. Secondly, all other drive elements are available for conveying of the other single items. Hence, the invention enables a material flow control in the bulk flow as if the single items were singulated. As a result of this, the sorting surface can be used very efficiently for parallel sorting of a multiplicity of single items in the 2D bulk. As a result of this, a particularly high throughput can be obtained with a relatively small overall area. Then, limits to the targeted movement of single items are therefore only still placed by the capabilities of the employed drive elements.

The at least one detection device can be selected as desired, provided the data supplied thereby render it possible to determine by means of triangulation a region on the sorting surface taken up by the respective single item. By way of example, the at least one detection device can comprise a camera or at least two cameras. In this case, the detected data comprise image data. Here, the employed cameras can be selected as desired. By way of example, these can be grayscale cameras, RGB color cameras, hyperspectral cameras or multispectral cameras. If provision is made of at least two cameras, triangulations for a respective determination of a region can be based on the image data detected simultaneously by the two cameras. If provision is made of only one camera, triangulations can be based on image data respectively recorded in succession while the single items move on the sorting surface. In addition, or as an alternative, to at least one camera, the at least one detection device can employ various different sensor technologies. By way of example, it can be possible by way of laser scanners to differentiate between laser points which are incident on a single item or else which are incident on the sorting surface in order to obtain a basis for the triangulations. Likewise, e.g. a laser section method can be used for the triangulations, for the purposes of which the detection device comprises a light source, for example in the form of the laser, in addition to the camera.

The regular determination of the regions which are taken up by respective single item on the sorting surface can take place at intervals of e.g. at most 1 second or at most 10 seconds. By way of example, the intervals can be matched to the size of the partial surfaces and the movement speed of the single items, for example in such a way that it is possible to expect a new determination to take place when, at the latest, a partial surface previously completely occupied by a single item is once again completely released.

The sorting surface can belong to any device. By way of example, it can belong to a sorting device which supplies the individual items to various destinations at the sorting surface or to a singulating device which supplies the single items individually to a single destination.

The sorting surface can have a rectangular shape, but also any other shape such as an L-shape or U-shape. By way of specific shapes, it is possible to provide the desired number of supply points and destinations at the sorting surface while, at the same time, the overall area remains limited. In particular, a ratio as desired between circumference and surface can be selected in such a way that the surface efficiency can be set in relation to the number of possible supply devices and end points.

Great freedoms for sorting algorithms emerge with the use of a multiplicity of partial surfaces and assigned drive elements which, in the case of an appropriate actuation of the selected combinations in each region of the sorting surface, permit movements in all directions. Complex sorting processes, including singulation, are made possible.

In an exemplary embodiment, the sorting surface is suitable for receiving a plurality of single items as 2D bulk. The sorting surface can be arranged in such a way that a plurality of single items are suppliable thereto as 1D bulk, wherein a 2D bulk can form by the movement of the single items on the sorting surface. Alternatively, the sorting surface can be arranged in such a way that a plurality of single items are already suppliable thereto as 2D bulk. Then, a plurality of single items can be supplied to the sorting surface as 2D bulk, in particular in the form of a stream of single items.

An exemplary embodiment moreover comprises the steps of determining an identification of the single items which are situated on the sorting surface and determining the destination at the sorting surface for each identified single item on the basis of the identification of the respective single item. By way of example, identification can occur on the basis of image data from at least one camera, for example on the basis of detected barcodes, patterns or text features. By way of example, the destination at the sorting surface can depend on a final destination of the single item, wherein the final destination can be given or determinable by the identification. Determining the identification of the single item and the destination at the sorting surface can be carried out by one exemplary embodiment of an apparatus according to the invention; however, one exemplary embodiment of an apparatus according to the invention can optionally also access data and/or services of a further apparatus to this end.

Thus, while the single items can be supplied to various destinations on the basis of an identification, alternatively, or additionally, other criteria for destination selection are also possible. Thus, different destinations could also be determined on the basis of the size of the single items, or a certain destination could be determined for a specific number of single items before a next destination is selected.

In an exemplary embodiment, the determination of a region on the sorting surface taken up by a respective single item by means of triangulations on the basis of the obtained data comprises determining benchmark data for the triangulations. If the data are image data from at least two cameras, evaluating structure features in the obtained image data and/or evaluating geometries in the obtained image data and/or identifying different materials in the obtained image data can be carried out for determining the benchmark data. In particular, such benchmark data can be points at an outer edge of a single item which can be unambiguously identified as corresponding to one another in the image data of the at least two cameras. By way of example, the corners of the surface of a single item come into question to this end. However, measured values from any other sensors can also be used for determining the benchmark data.

Additional criteria can also be taken into account for determining control commands for actuating the drive elements for a respective single item. Thus, for example, it is possible to take into account regions on the sorting surface taken up by other single items and/or the destinations of other single items at the sorting surface in order to avoid collisions and mutual impediments during the prompted movements of the single items. Alternatively, or additionally, it is moreover possible, for example, to take into account an evaluation of a dynamic behavior of the single item in response to preceding actuations of the drive elements for the single item. As result of this, a learning effect can be obtained. Alternatively, or additionally, it is possible, for example, to moreover take into account an output of at least one sensor. Such a sensor can be an ultrasound-based sensor, a laser-based sensor or any other sensor which can contribute to detecting data in respect of packages on the sorting surface. By way of example, such data can likewise relate to the geometry, the form or the material of packages. By way of example, an evaluation of reflections could also be used to detect merely the current presence of a single item at a specific location or in a specific region on the sorting surface. Alternatively, or additionally, it is moreover possible, for example, to take into account a response of the drive elements. As a result of this, it is possible, for example, to detect and take into account mutual impediments which have occurred and/or it is possible to account for different weights of the single items.

Determining control commands for actuating the drive elements taking into account the dynamic overall system corresponds to an observer/predictor design from control engineering and can enable an adaptive, self-learning, optimizing controller.

In exemplary embodiments, there is at no time a determination of control commands for actuating the drive elements for a whole path of a single item on the sorting surface.

In an exemplary embodiment, the control commands for actuating the drive elements are respectively only determined for drive elements which are assigned to a partial surface which is comprised by the specific region on the sorting surface taken up by the respective single item. That is to say, at least at the start of the actuation with a set of control commands, it is always only the drive elements situated below a single item which move.

In an exemplary embodiment, the control commands for actuating the drive elements will be respectively only determined for drive elements which are assigned to a partial surface which intersects with the specific region on the sorting surface taken up by the respective single item. In particular, this can be expedient if the partial surfaces are relatively large in comparison with the regions occupied by the packages.

In an exemplary embodiment, the control commands for actuating the drive elements will be respectively only determined for drive elements which are assigned to a partial surface which corresponds to, or adjoins, the specific region on the sorting surface (i.e. the partial surface is covered by the region or it is at least overlapping with the region) taken up by the respective single item. As a result of this, a few drive elements can already be actuated prospectively. This can reduce the required frequency of determining new control commands (with the same sought-after movement speed of the single items).

In an exemplary embodiment, the control commands for actuating the drive elements will be respectively only determined for part of a residual path of the single item to the determined destination, at least for the majority of a path of the single item on the sorting surface. Thus, at a given time, control commands are determined neither for the overall path nor for the respectively remaining complete residual path for as long as the single item is not situated directly in front of the destination.

Therefore, the actuation of the drive elements is an adaptive actuation in an exemplary embodiment. By way of example, it can be realized by means of fuzzy logic or a neural network or a fuzzy neural system. Here, an ideal overall behavior on the sorting surface with the adaptive path determination and the destination determination can then emerge automatically. However, other optimization algorithms may likewise be used as a basis.

In an exemplary embodiment, the drive elements comprise a plurality of suitably arranged rollers or balls, strips of a strip conveyor, sections of a sectional conveyor or belts of a belt conveyor. Further separately actuatable drive elements are likewise possible. It is understood that the drive elements can comprise a respectively associated motor and a gearbox or other connection elements in addition to the aforementioned components directly interacting with the single items, wherein, for example, it is possible to address these motors by way of the control commands.

By way of example, individually addressable drive elements can be arranged in the form of a matrix. This enables the use of hashing logics, like in databases.

It is possible to realize novel sorting architectures, which enable further efficiency gains, by arranging sorting surfaces on a plurality of planes with connections.

Further advantageous refinements of the invention can be gathered from the following detailed description of some exemplary embodiments of the present invention, in particular in conjunction with the figures. However, the figures should only serve for the purposes of clarification, but not for determining the scope of protection of the invention. The figures are not true to scale and should merely reflect the general concept of the present invention in an exemplary manner. In particular, features which are contained in the figures should in no way be considered to be a mandatory component of the present invention.

BRIEF DESCRIPTION OF THE DRAWINGS

In detail.

DETAILED DESCRIPTION OF SOME EXEMPLARY EMBODIMENTS OF THE INVENTION

The present invention is described below on the basis of exemplary embodiments which enable an efficient individual manipulation of packages.

Figure 1:
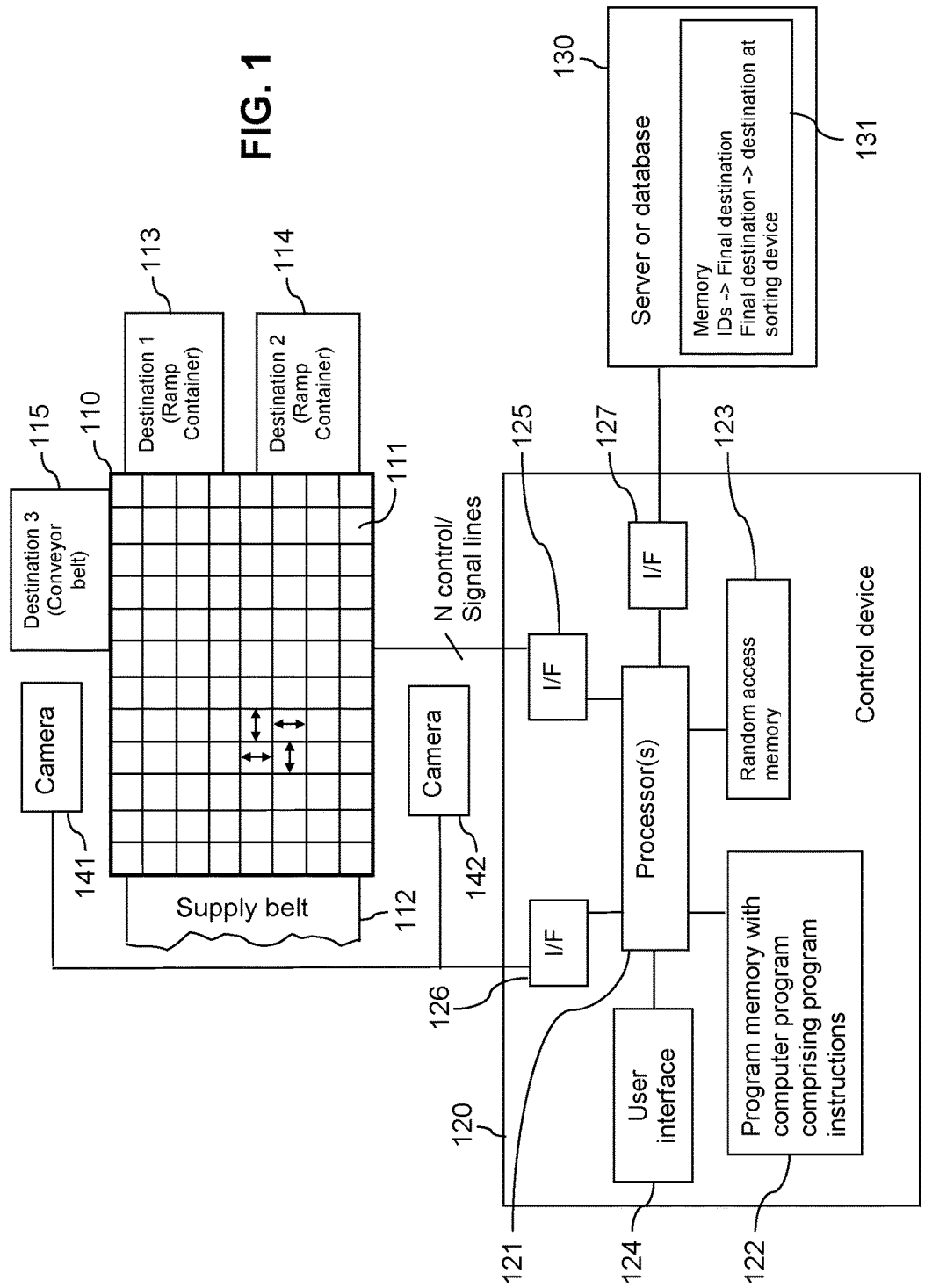
FIG. 1 shows a schematic illustration of an exemplary embodiment of a system according to the invention; and, FIG. 2 shows a flowchart with method steps of an exemplary embodiment of the method according to the invention.

FIG. 1 is a schematic illustration of an exemplary embodiment of a system according to the invention.

The system comprises a conveying system, a control device 120, a server and/or database 130 and two cameras 141, 142.

The conveying system comprises a sorting device with a sorting surface 110 which is subdivided into partial surfaces 111. In FIG. 1, these partial surfaces 111 are depicted as a multiplicity of squares in an exemplary manner. An individually actuatable drive element is assigned to each one of the partial surfaces 111. By way of example, each drive element can comprise a conveying element connected to a small motor. Depending on the control signal, the motor can transfer a predetermined force with a predetermined direction onto the conveying element. Here, the direction is predetermined by the control signal, while the force can be predetermined by the control signal or it can be fixedly predetermined. By way of example, the sorting device is a matrix roller conveyor. Here, rollers which are rotatable in two directions are arranged as conveying elements of N drive elements in the form of a matrix, alternating in the longitudinal direction and transverse direction in respect of their axis in both dimensions, which is illustrated in FIG. 1 for four partial surfaces, which are selected in an exemplary manner, by way of double-headed arrows. The use of rollers can be particularly energy-efficient since these do not require a separate drive member. However, alternatively, use can be made of a sorting surface 110 with any other individually actuatable drive elements, with even the matrix form for the arrangement not being essential. In particular, there is also no need for the sorting surface 110 to have a rectangular form.

In addition to the sorting device, the conveying system has e.g. a supply device, e.g. a supply belt 112 or another continuous conveyor. The supply belt 112 is embodied and arranged for supplying packages to the sorting surface 110 in a 2D bulk. However, on the supply belt 112 itself, the packages can also be conveyed as 3D bulk. The conveying system can moreover comprise a first ramp adjoining the sorting surface 110 to a roll container as a first possible destination 113 for packages, a second ramp adjoining the sorting surface 110 to a roll container as a second possible destination 114 for packages and a further conveyor belt adjoining the sorting surface 110 as a third possible destination 115 for packages.

The control device 120 is an exemplary embodiment of an apparatus according to the invention. The control device 120 can be a special apparatus or an appropriately configured conventional computer or server. The control device 120 comprises a processor 121, a program memory 122, a random access memory 123, a user interface 124 and various communication interfaces (I/F) 125, 126, 127. The processor 121 is connected to each one of these components 122-127.

The program memory 122 is non-volatile memory which stores computer programs with program instructions. Additionally, it can store parameters and other data. The processor 121 is configured to read and perform program instructions from the program memory 122. The random access memory 123 can be volatile memory which can be used by the processor 121 for buffer storing program instructions and data.

The user interface 124 can have any input and output means, such as e.g. a screen, optionally with touchscreen, loudspeakers, a keyboard and/or buttons, etc. The user interface 124 can be provided for maintenance, optimization and operation purposes.

The interfaces 125, 126, 127 can comprise at least one interface 125 for a connection to the drive elements of the sorting device, at least one interface 126 for a connection to the cameras 141, 142 and at least one interface 127 for a connection to the server 130. The at least one interface 125 for the drive elements could comprise N interfaces for a respective control and signal line to each one of the drive elements. The at least one interface 126 for the cameras 141, 142 could comprise two interfaces for a respective data line. The at least one interface 127 for the server 130 could comprise an interface for a data line. All interfaces can be wired or wireless. An interface for wireless connections—e.g. a WLAN interface—could also be used together for all designated wireless interfaces using different channels. The control device 120 can comprise various further components, for example a further memory, in which prescriptions by an operator and other data can be stored. The control device 120 can be assigned specifically to the sorting device 110 or else to a plurality of sorting devices of the conveying system. In the latter case, interfaces for communication with the cameras and drive elements of each sorting device are present.

The server 130 comprises a database or offers access to such a database. Alternatively, the control device 120 could also be connected directly to a database 130, without the interposition of a server. The database comprises a memory 131, in which an assignment of currently valid identifications (IDs) of packages to the final destinations of the packages is stored and, additionally for the sorting device 110 or separately for a plurality of sorting devices, an assignment of final destinations to a destination 113, 114, 115 of the respective sorting device. Alternatively, it could also possible that only the assignment of currently valid identifications of packages to the final destinations of the packages is stored in the database. Then, which final destination is assigned to which destination 113, 114, 115 at the sorting surface 110 of the sorting device could be predetermined in the control device 120. This information could be stored in a memory of the control device 120 and it could be updated in each case by an operator by way of the user interface 124.

The cameras 141, 142 are exemplary detection devices. By way of example, they can be normal RGB color cameras, or special cameras such as hyperspectral cameras which simplify a differentiation between various materials of recorded images. The cameras can also have suitable optical filters for the purposes of enabling an improved acquisition of the dimensions of packages. The cameras 141, 142 are arranged in such a way that they can each detect the complete sorting surface, but from different viewing angles. The distance of the cameras 141, 142 from one another is known with great precision and stored as a parameter in the program memory 122 or in a further memory of the control device 120. A specific angle in view of the orientation of the cameras 141, 142 in relation to one another can be assigned to each pixel of an image recorded by the cameras 141, 142. This assignment can likewise be stored in the program memory 122 or in a further memory of the control device 120 for each camera 141, 142. A plurality of pairs of cameras, which each detect a different specific region of the sorting surface, could also be used, particularly in the case of a large sorting surface.

The depicted or described connections between components should be understood to be functional connections. They can be realized directly or indirectly via a plurality of other components.

The depicted system can be developed in multifaceted ways within the scope of the invention, both by the addition of components and by the omission of components, as well as by the development of components. As result of this, further or alternative advantages can arise in each case.

Figure 2:
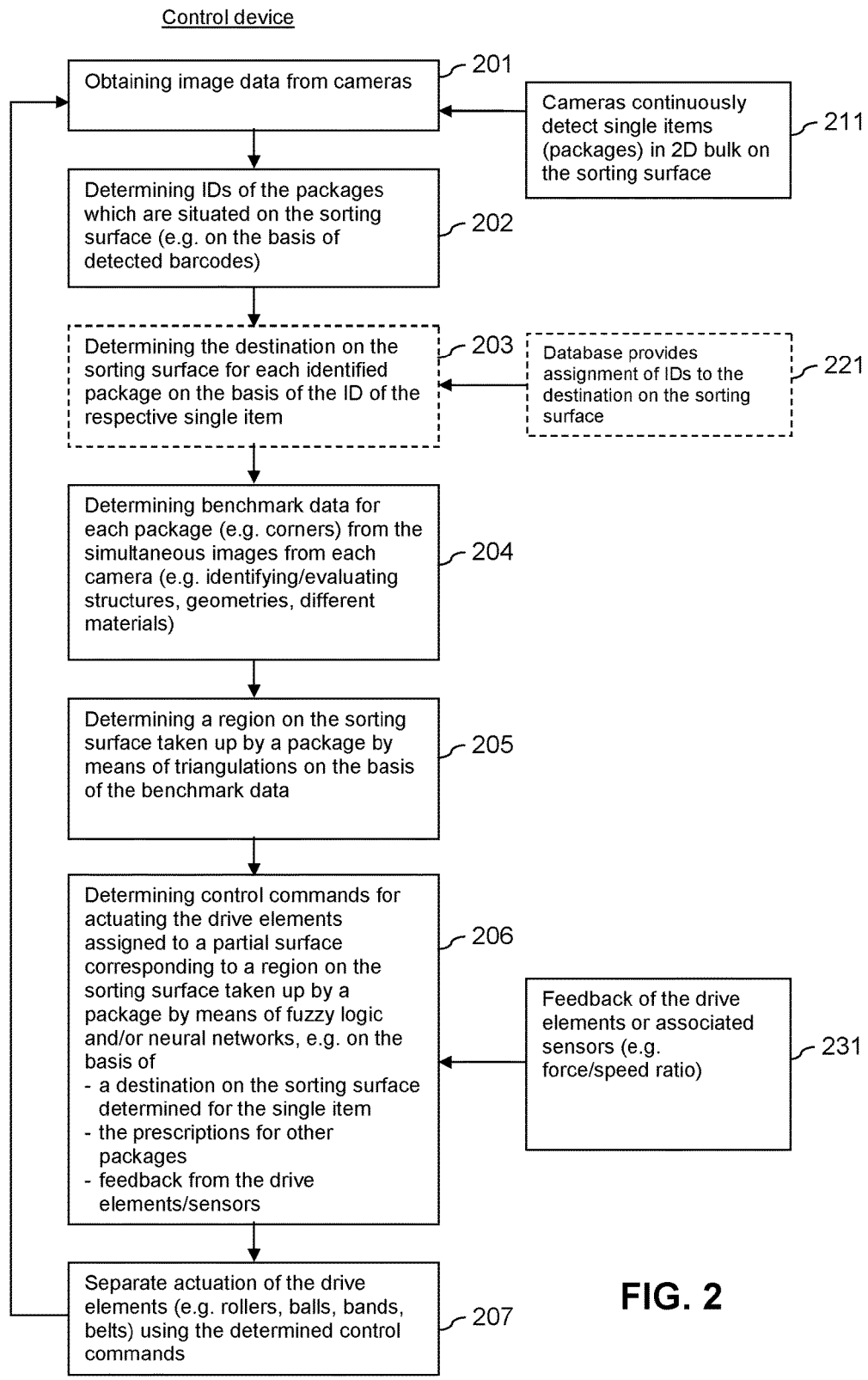

FIG. 2 is a flowchart which illustrates an exemplary embodiment of a method according to the invention, carried out in the system from FIG. 1.

In this case, the actions depicted on the left-hand side are performed by the control device 120 when the processor 121 reads and performs corresponding program instructions from the program memory 122 and thereby prompts the control device 120 to perform the actions.

The conveying system can be provided to sort received packages for onward transport. The packages, as exemplary single items, could be e.g. parcels. In the conveying system, packages are supplied to the sorting device by the supply belt 112 as 2D bulk. The packages are also situated on the sorting surface 110 of the sorting device as 2D bulk. The cameras 141, 142 detect all packages on the entire sorting surface 110 of the sorting device in a regular manner and at short time intervals. The image data are transferred to the control device 120. (Action 211)

The control device 120 obtains image data from the cameras 141, 142. (Action 201)

Initially, identifications of all packages on the sorting surface are determined on the basis of the image data. By way of example, such identifications can be barcodes. However, they could also be based on text recognition or other evaluations of the image data. (Action 202)

A destination 113, 114, 115 at the sorting surface 110 is determined for each package. (Action 203) Thus, for example, roll containers can be positioned at the ramps 113, 114, by means of which roll containers packages are intended to be brought into different delivery vehicles, depending on the final destination. Other packages should possibly initially be brought to a different unit of the conveying device by means of the conveyor belt 115. By way of example, from there, they could by way of telescopic conveyors be brought into relatively large vehicles, by means of which they are initially conveyed to other cities or to an airport, etc.

The destination at the sorting surface 110 can be determined in different ways. By way of example, a central server 130 can have stored an assignment of identifications to final destinations in a memory 131. However, alternatively, the identifications could themselves also contain the final destination. Then, a respective destination at the sorting surface of at least one sorting device of the conveying system could be assigned to each final destination in the memory 131. If packages with a specific final destination pass through a plurality of sorting devices of the conveying system, a destination can be stored at the associated sorting surface for the final destination for each one of the sorting devices. The control device 120 could then recall destinations at the sorting surface 110 for all determined identifications from the server 130. The server 130 then searches for the final destinations of the packages on the basis of the obtained identifications from the memory, determines the destinations 113, 114, 115 at the sorting surface 110 on the basis of the final destinations and makes the assignments of identifications to destinations at the sorting surface 110 available for the control device 120. (Action 221)

Alternatively, the control device 120 itself could store an assignment of final destinations to destinations at the sorting surface 110. In this case, it could be possible only to recall from the server 130 final destinations for the determined identifications where these do not emerge directly from the identifications. Then, the control device 120 can determine a destination 113, 114, 115 at the sorting surface 110 on the basis of the final destination of each identified package.

Moreover, the control device 120 determines benchmark data for each identified package from images of the two cameras 141, 142 recorded at the same time. (Action 204) By way of example, the benchmark data can be the upper corners of the top side of the package. Such corners can be identified on the basis of the image data by means of the identification of structures, geometries and different materials for an edge detection, wherein detected edges permit conclusions to be drawn about the corners of the package.

On the basis of the benchmark data, the control device 120 then determines a region on the sorting surface 110 of the sorting device currently taken up by a package. (Action 205) That is to say, the control device 120 determines not only a point-like position of the package, but rather position, circumference and location of a taken-up area. The region can be determined by means of a plurality of triangulations.

If a point in space is seen from two sites and if the positions of these sites, and hence also the distance of the sites from one another and also the angle at which the point is seen from the respective site with respect to the connecting line between the sites, are known, the precise position of the point in space can be determined from this information by means of triangulation. If now the upper corners of a cuboid package are determined on a sorting surface 110 by means of such a respective triangulation, this can be used to derive the region of the sorting surface 110 which is occupied by the package.

If a package is partly covered by another package from the view of one of the cameras 141, 142, the covered corners can be estimated in the image of the affected camera by virtue of the transition between the packages in the image being considered to be the edge of the partly covered package. Since the region taken up as being occupied by the package in this way is smaller than the actually occupied region, this is unproblematic for the actuation. By way of example, it could also be possible to use more than two cameras on a sorting surface in order to increase the probability that all upper corners of every package can in each case be detected by at least two cameras at all times.

The control commands for actuating the drive elements of the sorting device are determined after the regions on the sorting surface 110 which are occupied by all packages were determined. By way of example, the determination is carried out using fuzzy logic, a neural network or combination of both. (Action 206) The control commands are in each case determined separately for the drive elements assigned to a partial surface corresponding to a region respectively occupied by a package. The partial surfaces can be selected in such a way that, in each case, only drive elements which are completely situated below the respectively occupied region are actuated. In this way, it is possible to ensure that no opposing control commands for the same drive elements arise for different packages. However, provision could also already be made for e.g. the drive elements lying directly in front of the currently occupied region in the movement direction of the package to be actuated as well, at least if no conflict arises. The drive elements are actuated in such a way that they move the package in such a way that it moves in the direction of the destination of the package at the sorting surface 110. However, in this case movement need not be guided directly to the destination and it need not always occur immediately. Thus, other criteria in addition to the destination can also be taken into account. Thus, the positions and destinations of other packages can be taken into account for the control commands in respect of one package so that the packages do not block one another along the path thereof. By taking into account such information, it is possible, for example, to adapt the direction of the movement of at least one of the packages. Optionally, an adaptation of the speed of the drive elements by means of the control commands can also contribute to avoiding collisions, wherein the speed could briefly also be reduced to zero.

It is understood that, additionally or alternatively, provision could also be made of control commands for any other actuations. Thus, for example, in certain circumstances, packages could only be identified as a vague amount on the basis of the image data. By way of example, "approximately" one package could be identified in a region on the basis of probabilities or it could be possible to identify "approximately" two packages lying very close together. In such a case, the drive elements could be prompted to move faster in a front region, and slower in a rear region, below the "approximately" one package or the "approximately" two packages in order to bring about a clear separation in the case of two packages and therefore enable an effective separate treatment of the two packages.

The determined control commands are then used to actuate the drive elements situated under the packages. (Action 207)

Additionally, or alternatively, feedback from the drive elements could be taken into account when determining the control commands in Action 206. (Action 231) By way of example, this feedback could comprise the speed at which the drive elements move in the case of the designated drive force. Firstly, this would allow a greater force to be applied for heavy packages so that these can be moved at a similar speed to lighter packages. Secondly, a standstill of drive elements or even a movement counter to the movement designated on the basis of the control commands could indicate that two packages are blocking one another. In this case, there could be an alternative actuation for obtaining an evasive movement.

Data from any other sensors could also be incorporated in the determination of the control commands.

Actions 201 to 207 are repeated regularly, for example once a second. Any other repetition rate is likewise possible. It is understood that, in this case, the destination at the sorting surface 110 for an identified package need only be determined once in Action 203. In FIG. 2, this is indicated by virtue of Actions 203 and 221 being depicted as boxes with dashed lines.

Thus, certain embodiments of the invention provide for single items in a conveying system to be identified continuously and located at the same time by means of image data from cameras while they are situated in a bulk of single items on a sorting surface. By means of adaptive path tracking on the basis of the continual measurement of the position of the packages, it is possible then to individually manipulate each single item at its position by way of conveying technology in such a way that the movement of the packages can always be ideally adapted to the respective overall situation. This allows a particularly area-efficient use of the sorting surface.

The blocks 201-207 in FIG. 2 can also be considered representations of corresponding program instructions in the program memory 122.

The method presented in an exemplary manner can be developed in multifaceted ways within the scope of the invention, by the addition of actions, by the omission of actions as well as by the development of actions. As result of this, further advantages can emerge in each case. Moreover, the sequence of the explained actions in the flowchart in FIG. 2 is not mandatory; alternative sequences are conceivable. Finally, the actions can be implemented in various ways.

It is understood that, in general, the described embodiments are merely examples which can be modified and/or complemented in multifaceted ways within the scope of the claims. In particular, each feature which was described for specific exemplary embodiment can be used on its own or in combination with other features in any other exemplary embodiment Each feature which was described for an exemplary embodiment of a specific category can also be used in an appropriate manner in an exemplary embodiment of another category.

The invention claimed is:

1. A method, performed by an apparatus or a system, comprising the following:
   receiving data from at least one detection device which regularly detects single items on a sorting surface of a conveying system, wherein a separately actuatable drive element is assigned in each case to a plurality of partial surfaces of the sorting surface,
   determining in regular intervals a region on the sorting surface taken up by the respective single item on the basis of positions of a plurality of benchmarks of the single item for as long as the single item is situated on the sorting surface, each benchmark being detected with different angles by the at least one detection device, the position of each benchmark being determined based on the obtained data by means of a triangulation,
   determining control commands for actuating the drive elements, which are assigned to a partial surface and correspond to a specific region on the sorting surface taken up by the respective single item, on the basis of a destination at the sorting surface provided for the respective single item and
   actuating the drive elements with the determined control commands.

2. The method according to claim 1, wherein at least one of the following criteria applies:
   the sorting surface is configured for simultaneously receiving a plurality of single items as 2D bulk;
   the sorting surface is arranged for receiving a plurality of single items as 2D bulk; and
   a plurality of single items are supplied to the sorting surface as 2D bulk.

3. The method according to claim 1, furthermore comprising the following:
   determining an identification of the single items which are situated on the sorting surface and
   determining the designated destination at the sorting surface for each identified single item on the basis of the identification of the respective single item.

4. The method according to claim 1, wherein the determination of a region on the sorting surface taken up by a respective single item by means of triangulations on the basis of the obtained data comprises at least one of the following actions for determining benchmark data for the triangulations:
   evaluating structure features;
   evaluating geometries; and
   identifying different materials.

5. The method according to claim 1, wherein at least one of the following pieces of information is additionally taken into account for determining control commands for actuating the drive elements for a respective single item:
   regions on the sorting surface taken up by other single item;
   the destinations of other single items at the sorting surface;
   an output of at least one sensor; and
   an evaluation of a dynamic behavior of the single item in response to preceding actuations of the drive elements for the single item.

6. The method according to claim 1, wherein the following is additionally taken into account for determining control commands for actuating the drive elements for a respective single item:
  a feedback of the drive elements.

7. The method according to claim 1, wherein the control commands for actuating the drive elements are
  respectively only determined for drive elements which are assigned to a partial surface which is comprised by the specific region on the sorting surface taken up by the respective single item, or
  respectively only determined for drive elements which are assigned to a partial surface which intersects with the specific region on the sorting surface taken up by the respective single item, or
  respectively only determined for drive elements which are assigned to a partial surface which corresponds to, or adjoins, the specific region on the sorting surface taken up by the respective single item, or
  respectively only determined for part of a residual path of the single item to the determined destination, at least for the majority of a path of the single item on the sorting surface.

8. The method according to claim 1, wherein the actuation of the drive elements is an adaptive actuation which is realized by means of
  a fuzzy logic or
  a neural network or
  a fuzzy neural system.

9. The method according to claim 1, wherein the drive elements comprise the following:
  rollers or
  balls or
  strips of a strip conveyor or
  sections of a sectional conveyor or
  belts of a belt conveyor.

10. An apparatus comprising at least one memory with program instructions and at least one processor, the program instructions, when executed by the at least one processor, configured to cause the apparatus or a system to perform the following:
  receive data from at least one detection device which regularly detects single items on a sorting surface of a conveying system, wherein a separately actuatable drive element is assigned in each case to a plurality of partial surfaces of the sorting surface,
  determine in regular intervals a region on the sorting surface taken up by the respective single item on the basis of positions of a plurality of benchmarks of the single item for as long as the single item is situated on the sorting surface, each benchmark being detected with different angles by the at least one detection device, the position of each benchmark being determined based on the obtained data by means of a triangulation,
  determine control commands for actuating the drive elements, which are assigned to a partial surface and correspond to a specific region on the sorting surface taken up by the respective single item, on the basis of a destination at the sorting surface provided for the respective single item and
  actuate the drive elements with the determined control commands.

11. The apparatus according to claim 10, wherein at least one of the following criteria applies:
  the sorting surface is configured for simultaneously receiving a plurality of single items as 2D bulk,
  the sorting surface is arranged for receiving a plurality of single items as 2D bulk, and
  a plurality of single items are supplied to the sorting surface as 2D bulk.

12. The apparatus according to claim 10, wherein the program instructions, when executed by the at least one processor, are furthermore configured to cause the apparatus or the system to:
  determine an identification of the single items which are situated on the sorting surface and
  determine the designated destination at the sorting surface for each identified single item on the basis of the identification of the respective single item.

13. The apparatus according to claim 10, wherein the determination of a region on the sorting surface taken up by a respective single item by means of triangulations on the basis of the obtained data comprises at least one of the following actions for determining benchmark data for the triangulations:
  evaluating structure features;
  evaluating geometries; and
  identifying different materials.

14. The apparatus according to claim 10, wherein at least one of the following pieces of information is additionally taken into account for determining control commands for actuating the drive elements for a respective single item:
  regions on the sorting surface taken up by other single items;
  the destinations of other single items at the sorting surface;
  an output of at least one sensor; and
  an evaluation of a dynamic behavior of the single item in response to preceding actuations of the drive elements for the single item.

15. The apparatus according to claim 10, wherein the following is additionally taken into account for determining control commands for actuating the drive elements for a respective single item:
  a feedback of the drive elements.

16. The apparatus according to claim 10, wherein the control commands for actuating the drive elements are
  respectively only determined for drive elements which are assigned to a partial surface which is comprised by the specific region on the sorting surface taken up by the respective single item, or
  respectively only determined for drive elements which are assigned to a partial surface which intersects with the specific region on the sorting surface taken up by the respective single item, or
  respectively only determined for drive elements which are assigned to a partial surface which corresponds to, or adjoins, the specific region on the sorting surface taken up by the respective single item, or
  respectively only determined for part of a residual path of the single item to the determined destination, at least for the majority of a path of the single item on the sorting surface.

17. The apparatus according to claim 10, wherein the actuation of the drive elements is an adaptive actuation which is realized by means of
  a fuzzy logic or
  a neural network or
  a fuzzy neural system.

18. The apparatus according to claim 10, wherein the drive elements comprise the following:
  rollers or
  balls or strips of a strip conveyor or sections of a sectional conveyor or belts of a belt conveyor.

19. The apparatus according to claim 10, wherein the apparatus is a module for a control device or a control device or a computer or a server.

20. A non-transitory computer-readable medium storing a computer program with program instructions which are configured to prompt an apparatus or a system to perform the following when they are executed by at least one processor:

receive data from at least one detection device which regularly detects single items on a sorting surface of a conveying system, wherein a separately actuatable drive element is assigned in each case to a plurality of partial surfaces of the sorting surface, determine in regular intervals a region on the sorting surface taken up by the respective single item on the basis of positions of a plurality of benchmarks of the single item for as long as the single item is situated on the sorting surface, each benchmark being detected with different angles by the at least one detection device, the position of each benchmark being determined based on the obtained data by means of a triangulation, determine control commands for actuating the drive elements, which are assigned to a partial surface and correspond to a specific region on the sorting surface taken up by the respective single item, on the basis of a destination at the sorting surface provided for the respective single item and actuate the drive elements with the determined control commands.

* * * * *